J. W. RICKETTS.
PNEUMATIC WHEEL.
APPLICATION FILED FEB. 3, 1917.

1,391,407.

Patented Sept. 20, 1921.

Inventor
JOSEPH W. RICKETTS.

Witness
Emma B. Wisner.

By Charles E. Wisner
Attorney

UNITED STATES PATENT OFFICE.

JOSEPH W. RICKETTS, OF DETROIT, MICHIGAN.

PNEUMATIC WHEEL.

1,391,407.

Specification of Letters Patent.   Patented Sept. 20, 1921.

Application filed February 3, 1917.   Serial No. 146,361.

*To all whom it may concern:*

Be it known that I, JOSEPH W. RICKETTS, a citizen of the United States, residing at Detroit, county of Wayne, State of Michigan, have invented a certain new and useful Improvement in Pneumatic Wheels, and declare the following to be a full, clear, and exact description of the same, such as will enable others skilled in the art to which it pertains to make and use the same, reference being had to the accompanying drawings, which form a part of this specification.

This invention relates to pneumatic wheels for automobiles or the like, and its object is an automobile wheel provided with a solid rubber tire and having the resiliency of a wheel equipped with a pneumatic tire. Another object of this invention is an automobile wheel having a pneumatic tire therein, the wheel being provided with spaces for expansion of the tire and also provided with lugs for compression thereof. These and other objects and the several novel features of the invention in its preferred form are hereinafter more fully described and claimed and shown in the accompanying drawings in which—

Similar characters refer to similar parts throughout the drawing and specification.

Figure 2:
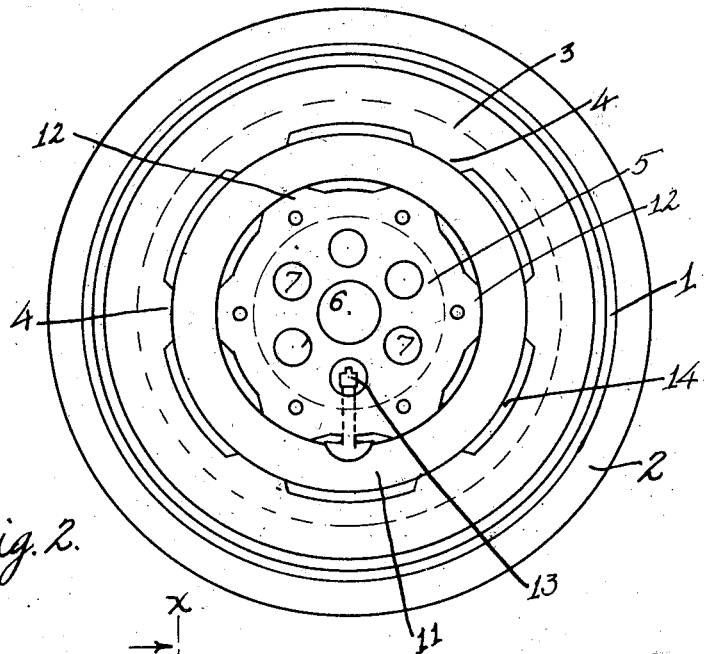
Fig. 2 is a similar view of the wheel with the side plate removed showing the pneumatic tire therein.

The automobile wheel is provided with a metal rim 1 for holding a solid rubber tire 2, the metal rim being secured to the wooden felly 3. As may be seen more particularly in Fig. 2, this felly is provided with raised portions or lugs 4 about the inner periphery thereof and an inner wooden portion 5 is provided having an aperture 6 adapted to fit about the axle of the automobile. This central or hub portion 5 also has apertures 7 therein or spokes may be provided instead of providing the hub portion with apertures. The rim of the hub portion is of sufficient radial thickness to allow the bolts 8 to be passed therethrough, the bolts being adapted to hold the two side plates 9 in place, the side plates 9 being rounded at 10 to provide a space about a pneumatic tube 11 which fits in the space between the wooden felly 3 and the hub portion 5, the hub portion 5 being provided with lugs or raised portions 12 about the periphery thereof which are adapted to be set opposite the portions 4 on the felly 3. These raised portions hold the pneumatic tube 11 tightly in position so that it cannot move or creep within the wheel.

Figure 1:
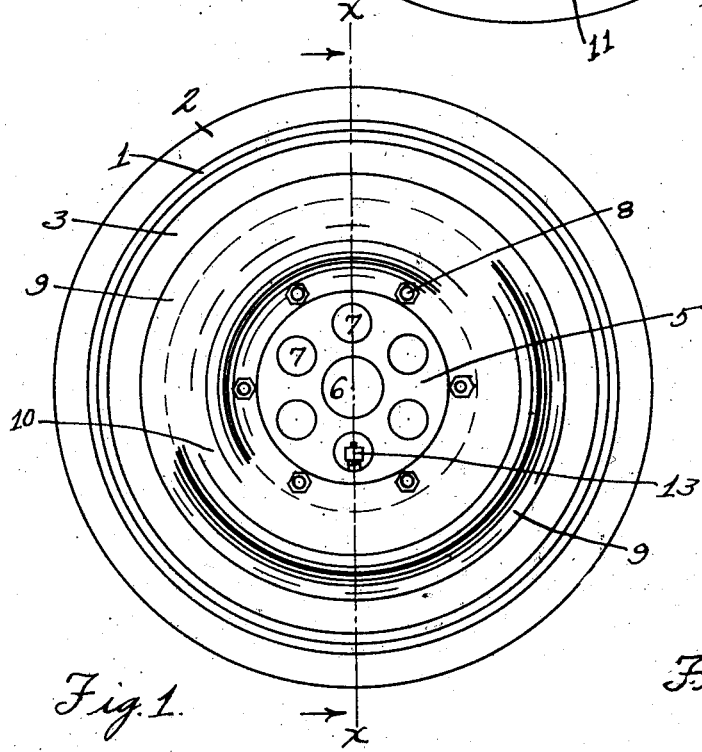
Figure 1 is a side view of the wheel assembled for mounting on an automobile.
Figure 3:
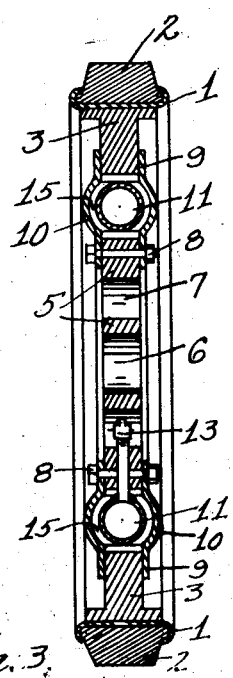
Fig. 3 is a section taken on line x—x of Fig. 1.

The well known type of valve 13 is provided, the inner end being placed in an accessible position so that it may be connected to a pump to inflate the pneumatic tube 11. As will be seen more particularly from Figs. 1 and 3, the plates 9 are not connected with the outer rim portion 3 but fit closely to the side thereof and tend to prevent lateral displacement of the inner wheel portion in relation to the outer portion.

In operation the wheel is secured to the axle of the automobile in any approved manner, and as it rotates, the weight of the automobile will tend to compress the pneumatic tube 11. As will be seen more particularly from Fig. 2 the pneumatic tube 11 will have the greatest compression at the points between the lugs 4 and 12. The spaces 14 between the said lugs allow for expansion of the pneumatic tube 11 so that the utmost resiliency of the pneumatic tube is thus obtained. As will be noticed more particularly in Fig. 3 the portion 10 of the plates 9 being raised, a space 15 is provided about the tube 11 to allow lateral expansion thereof so that the tube is held in place by the lugs 4 and 12 only and it can be clearly seen, as the weight comes onto the tube, space is provided into which it may expand, the compression points being between the lugs on the hub portion and the felly. The portion of the plates 9 fitting against the felly 3 and being unsecured thereto, allows radial movement of the felly portion of the wheel in relation to the hub portion thereof.

From the foregoing description it becomes evident that the device is of a somewhat simple nature, yet is very efficient in operation and will wear much longer than the ordinary type of wheel and pneumatic tire.

Having thus briefly described my invention, its utility and mode of operation, what I claim and desire to secure by Letters Patent of the United States is—

In a pneumatic wheel, a felly carrying a tire, a central hub portion, the felly having a part extending toward the hub and the hub being of the same width and in the same plane as the inwardly extending portion of the felly, an inflatable tube circular in cross section between the felly and hub portions, a valve stem for the tube, the inner periphery of the felly and the outer periphery of the hub providing a seat for the tube each being provided with corresponding recesses and pairs in radial alinement, plates secured to opposite sides of the hub portion and engaging the felly, the plates being centrally apertured and exposing the hub and being formed with annular recesses inclosing the tube space between the said felly and hub, the said hub having a central aperture for an axle and a second aperture extending transversely therethrough at a distance from the center of the hub, said hub having a radial aperture extending between the second aperture and a recess in the tube seat for reception of the valve stem.

In testimony whereof I sign this specification.

JOSEPH W. RICKETTS.